United States Patent [19]

Ballantyne

[11] 4,191,409
[45] Mar. 4, 1980

[54] CORRUGATED CONDUIT RETAINER

[75] Inventor: David B. Ballantyne, Southfield, Mich.

[73] Assignee: General Motors Corporation, Detroit, Mich.

[21] Appl. No.: 946,506

[22] Filed: Sep. 28, 1978

[51] Int. Cl.² ............................................ F16L 5/00
[52] U.S. Cl. ............................ 285/189; 174/153 G; 403/194; 403/238; 24/73 C; 285/162; 285/226
[58] Field of Search ............... 24/73 C, 73 SA, 21 W; 248/27.1, 56; 285/194, 321, 162, 226, DIG. 4, 260, 258, 189, 222, 7, 158, 128; 49/167; 174/52 R, 72 A, 152 G, 153 G, DIG. 9; 403/238–240, 194, 197, 201; 16/2

[56] References Cited

U.S. PATENT DOCUMENTS

| 1,525,538 | 2/1925 | Evans | 285/260 |
|---|---|---|---|
| 1,659,094 | 2/1928 | Godfrey | 285/158 X |
| 1,994,617 | 3/1935 | Meehan | 85/8.5 |
| 2,099,413 | 11/1937 | White | 285/226 X |
| 2,255,217 | 9/1941 | Hill | 85/8.5 |
| 2,322,138 | 6/1943 | Jenny | 85/8.5 |
| 2,458,409 | 1/1949 | Paige | 285/162 |
| 2,540,790 | 2/1951 | Kost | 24/213 |
| 2,589,780 | 3/1952 | Costello et al. | 248/56 |
| 2,697,871 | 12/1954 | Herman et al. | 29/299 |
| 3,151,905 | 10/1964 | Reuther et al. | 285/189 X |
| 3,285,283 | 11/1966 | Calvin | 285/315 X |
| 4,015,961 | 4/1977 | Howard et al. | 285/189 X |

Primary Examiner—Dave W. Arola
Attorney, Agent, or Firm—R. L. Phillips

[57] ABSTRACT

A retainer for retaining a corrugated conduit in a wall opening comprising a pair of rings provided by formation of a spring wire or a slit annular part wherein the retainer is insertable into the end of the conduit and is contracted with contraction of the conduit by an externally applied force to permit insertion of the conduit in the opening and then on release of the contracting force the retainer expands and holds two of the conduit corrugations outward of the opening on opposite sides of the wall to prevent pull-out or push-in of the conduit while also retaining an intermediately located corrugation of the conduit in sealing contact with the surface of the opening.

1 Claim, 11 Drawing Figures

CORRUGATED CONDUIT RETAINER

This invention relates to a corrugated conduit retainer and more particularly to a retainer for retaining an elastic corrugated conduit in sealing engagement in a wall opening.

In the attachment of a flexible corrugated conduit made of rubber or other elastic material, the conduit is typically either clamped to a male member or when there is no such member to attach to, the conduit may be provided with an attaching flange at one or both of its ends. The former type of installation is the most common and is readily accomplished with various kinds of hose clamps such as the screw type and spring wire type and the conduit can be cut to various desired lengths from coiled stock. On the other hand, a conduit with integral flanges requires fasteners and a seal at the joint, and in addition, must be stocked in various desired lengths. One example of the latter type of installation is found in motor vehicles having doors equipped with power operated components such as a window actuator and a door lock. The wiring for these components is passed through openings in the facings of the doors and vehicle body with the corrugated conduit extending between the facings and protecting the wiring. The conduit has molded-in-place metal flanges at its ends which are attached with threaded fasteners to the facings over the wire openings therein and there is required a sealing operation at the juncture of the flanges with the facings to prevent water leakage. The above wiring conduit with integral flanges and associated sealing and installation operations must be preformed to the proper length rather than cut to length from stock and is relatively costly and requires greater installation and removal time as compared with a simple clamp installation. Furthermore, the integral flanges reduce the number of corrugations possible along the length of the conduit and thus reduce the ability of the conduit to flex adjacent the end joints without inward collapse as the car door is opened and closed.

The retainer of the present invention provides for sealingly retaining a corrugated conduit to a wall opening at lower cost and more quickly than the flange type above described and is comparable in cost and installation and removal time with the simplest of clamps, i.e., the contractable spring wire type. The present retainer requires no modifications to standard corrugated conduit stock and can be formed of spring steel wire or strip or be an injection molded plastic part. In the different embodiments of the retainer of the invention, a pair of parallel, co-axial, expandable rings or loops are provided which are receivable within the end of the conduit to engage the interior of adjacent outwardly extending corrugations thereof on the opposite interior sides of an intermediate inwardly extending corrugation joining the former. The spacing between the corrugations and retainer rings is greater than the wall thickness, and the end of the conduit with the retainer in place is contractable to permit its insertion in the wall opening and positioning of the retainer rings within their associated corrugations on opposite sides of the wall. With the conduit inserted in the wall opening and then on release of the compressive force on the conduit and retainer, the rings expand to retain their conduit corrugations outward of the hole on opposite sides of the wall to positively prevent pull-out or push-in of the conduit while holding the intermediate inwardly extending corrugation outward in sealing engagement against the surface of the hole. The retainer further includes either a pair of arms extending from one of the rings in the case of the wire spring embodiment or an annular extension of one of the rings in the steel strip or plastic formed embodiment. These extensions provide means for responding to the compression of the conduit by an externally applied compressive force to contract the retainer along with the conduit to permit both insertion and removal of the conduit relative to the wall opening with the conduit retainer in place. In addition, for use with a wire protecting conduit all of the embodiments of the retainer may be provided with integral wiring hangers for supporting the wiring in spaced relationship to the interior of the conduit at the conduit's ends to prevent chafing of the wiring as the conduit is flexed.

Thus, the retainer of the present invention permits the use of standard flexible corrugated conduit stock without any modifications thereof and also enables the greatest number of corrugations in an allowed space for controlled accordion bending to prevent inward collapse of the conduit. In addition, the retainer of the present invention is adapted to be assembled in one or both ends of the conduit as a subassembly to simplify and reduce the time of installation. Furthermore, with the contraction of the retainer accomplished by compression of the conduit and retainer intermediate the conduit ends, the conduit is thus adapted with the retainer in place to a blind installation where there is access to only that side of the wall from which the insertion is made.

An object of the present invention is to provide a new and improved corrugated conduit retainer.

Another object is to provide a new and improved retainer for retaining an elastic corrugated conduit in a wall opening.

Another object is to provide a retainer having a pair of expandable rings or loops which is insertable into the end of an elastic corrugated conduit and is thereafter contractable by an externally applied force to the conduit to permit both insertion and removal of the conduit relative to a wall opening and wherein the rings on release of the applied force expand to prevent pull-out or push-in of the conduit relative to the wall while retaining the conduit in sealing engagement with the surface of the opening.

Another object is to provide a retainer, formed with a pair of expandable rings from spring wire or a spring metal strip or injection molding, which is insertable in the end of an elastic corrugated conduit and is responsive to external force on the conduit to contract to permit insertion and removal of the conduit relative to a hole in a wall and upon removal of the applied force expand to prevent pull-out or push-in of the conduit relative to the wall while maintaining the conduit in sealing engagement with the surface of the hole.

Another object is to provide a new and improved and low cost retainer which is insertable into an end of an elastic corrugated conduit and is responsive to an externally applied force on the conduit to contract to permit insertion and removal of the conduit relative to a hole in a wall and upon insertion and removal of the applied force expands to force adjacent corrugations to sandwich the wall to prevent pull-out or push-in of the conduit while also forcing sealing engagement of the conduit with the surface of the hole.

These and other objects of the present invention will be more apparent from the following description and drawings in which.

Figure 1:
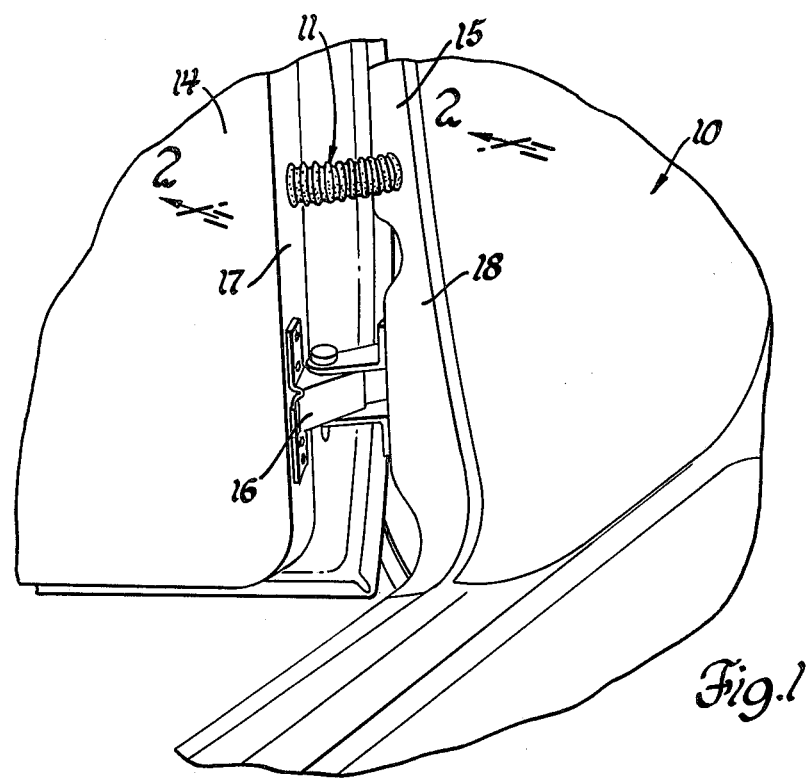
FIG. 1 is a partial perspective view of a motor vehicle looking from the inside out showing a door partially open with a corrugated conduit retained on the door and vehicle body facings by retainers according to one embodiment of the invention.
Figure 2:
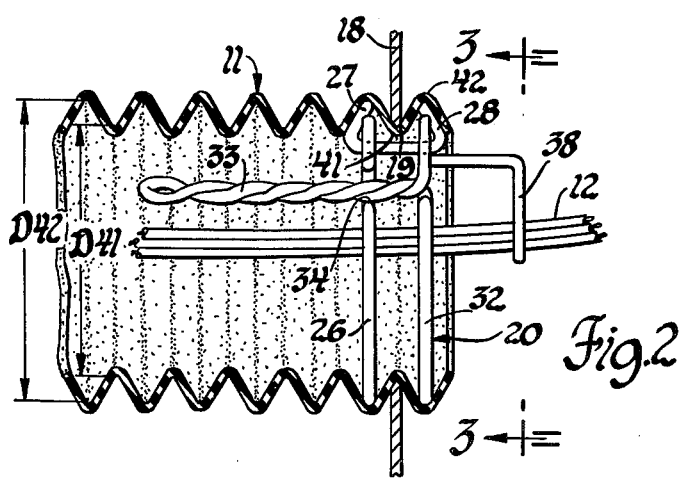
FIG. 2 is an enlarged view taken along the line 2—2 in FIG. 1 showing one end of the conduit installation.
Figure 3:
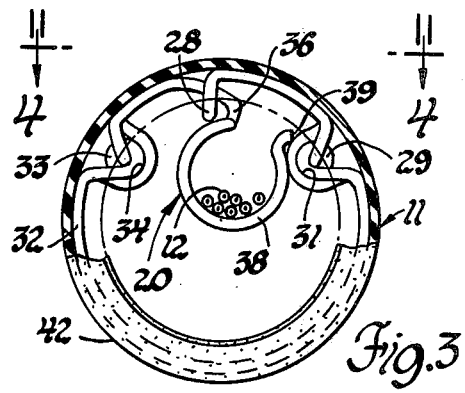
FIG. 3 is a view taken along the line 3—3 in FIG. 2 with the conduit broken away.
Figure 6:
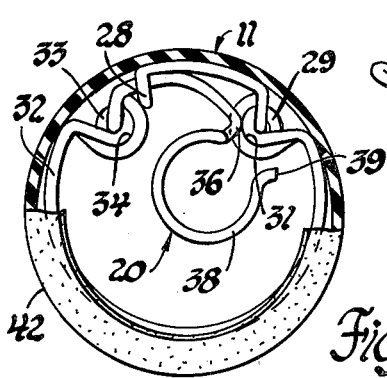
FIG. 6 is a view similar to FIG. 3 but showing the retainer contracted for insertion or removal of the conduit.
Figures 4, 5:
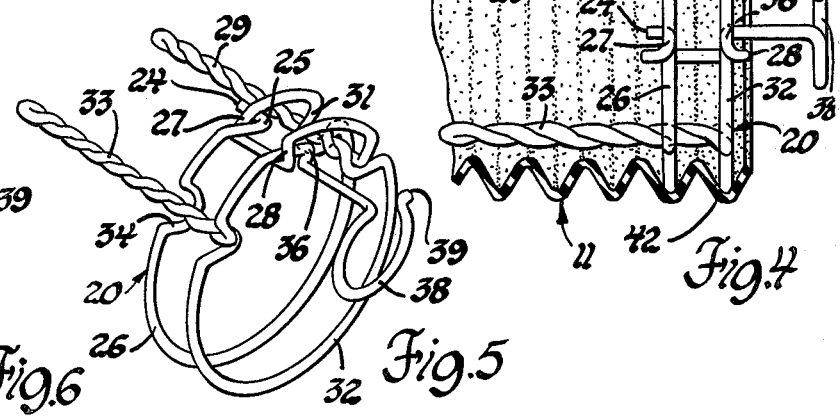
FIG. 4 is a view taken along the line 4—4 in FIG. 3 with the conduit broken away.
FIG. 5 is a perspective view of the retainer in FIG. 2 prior to installation in the conduit.
Figure 7:
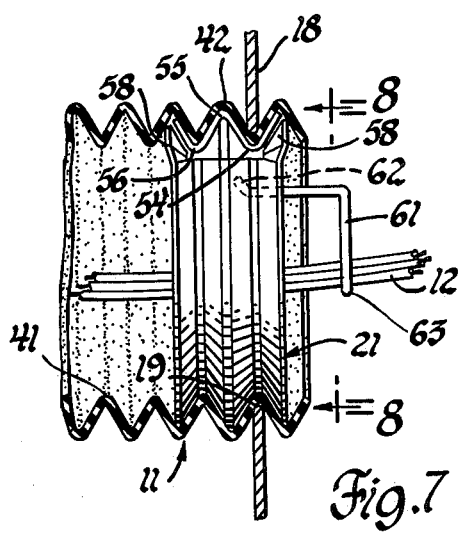
FIG. 7 is a view similar to FIG. 2 showing another embodiment of the retainer according to the present invention.
Figure 8:
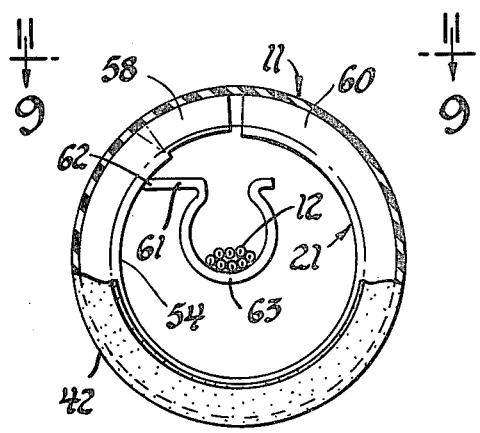
FIG. 8 is a view taken along the line 8—8 in FIG. 7 with the conduit broken away.
Figure 9:
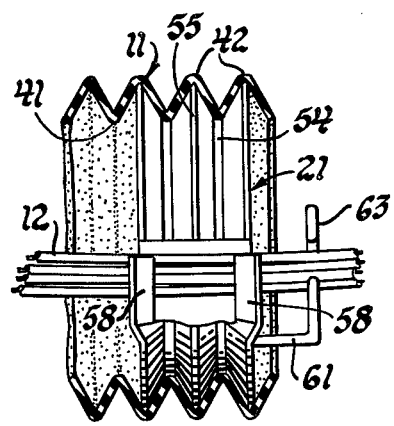
FIG. 9 is a view taken along the line 9—9 in FIG. 8 with the conduit broken away.
Figure 10:
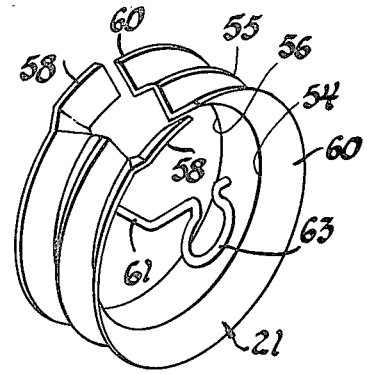
FIG. 10 is a perspective view of the retainer in FIG. 7 prior to installation in the conduit.
Figure 11:
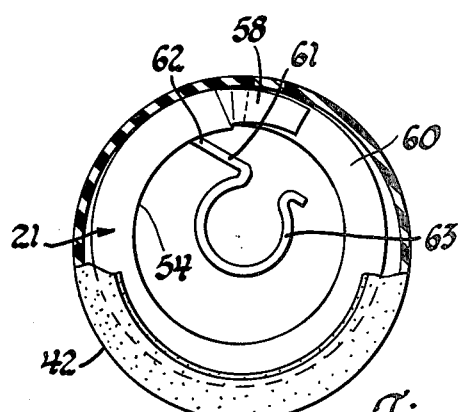
FIG. 11 is a view similar to FIG. 8 but showing the retainer contracted for insertion or removal of the conduit.

Referring to FIGS. 1, 2, and 7, the retainer of the present invention is disclosed in use in a motor vehicle 10 to retain a flexible corrugated conduit 11. The conduit 11 protects wiring 12 serving power components, not shown, in a door 14 that is supported on the vehicle body 15 by a pair of hinges 16 of which only the lower one is shown. The corrugated conduit 11 is formed of rubber or other suitable elastic material with alternately inwardly and outwardly projecting corrugations of saw-tooth configuration and extends between the facings 17 and 18 of the door and body. The conduit 11 is retained at its opposite ends in a round opening or hole 19 in each of the facings or walls through which the wiring extends by the expandable wire retainer embodiment 20 of the invention shown in FIGS. 2-6 or by the expandable split ring embodiment 21 of the invention shown in FIGS. 7-11.

Describing first the retainer 20, it is formed from a single piece of round spring wire which starts at one end 24 with a right angle bend 25 and then makes a complete loop 26 whereafter it then takes a double right angle bend 27 over and under the bend 25. The wire then makes another double right angle bend 28 and is thereafter looped and twisted to form a relatively rigid axially extending arm 29 which extends through a valley 31 formed in loop 26. Proceeding from the twisted arm 29, the wire defines a second loop 32 which is parallel to and co-axial with the first loop 26 and at an intermediate point is itself looped and twisted again to provide a second arm 33 which is parallel to the first arm 29 and extends axially through a second valley 34 formed in the first loop 26. The wire proceeds from the last arm 33 to complete the loop 32 and then makes a double right angle bend 36 over and under the bend 28 whereafter it is formed into a wiring hook 38 before terminating at its other end 39.

Referring to FIG. 2, the diameter of the hole 19 in the wall through which the wiring extends is made equal to or slightly less than the diameter $D_{41}$ of the valleys of the inwardly extending corrugations 41 of the conduit leaving the outwardly extending corrugations 42 to thus project fully outward of the hole on the opposite sides of the wall after the conduit has been inserted. The two loops or rings 26 and 32 of the retainer 20 are circular and have normal expanded diameters substantially larger than the internal diameter $D_{42}$ of the outwardly extending corrugations 42 and are contractable as shown in FIG. 6 to permit insertion of the retainer in the end of the conduit prior to its assembly to the wall with the arms 29 and 33 extending inward of the conduit and the wiring support 38 extending outward thereof. The two arms 29 and 33 extend adjacent the inside diameter $D_{41}$ of the inwardly projecting corrugations 41 and on compression of the end of the conduit by a conventional ring clamping tool applied to the exterior of the conduit in the arm area, the arms are pressed inwardly and toward each other. Since the arms 29 and 33 are adjacent the opposite ends of the loop 32 and also engage the other loop 26 adjacent its opposite ends in the valleys 31 and 34, the two loops are thus forced to tighten or contract sufficiently to permit tilted or angled insertion of the end-most corrugation 42 biased by the loop 32 through the hole 19. Then on forced alignment of the conduit with the hole and release of the external force on the conduit, the two loops 26 and 32 expand and force the two outwardly extending corrugations 42 which they engage outward of the hole on opposite sides of the wall while also forcing the intermediate inwardly extending corrugation 41 outward against the surface of the hole to provide sealing. It will be understood that a similar retainer 20 is inserted in the opposite end of the conduit and serves to attach the conduit at its other end in the hole in the door facing 17. With the conduit 11 thus secured in place, the wiring 12 is fed through the conduit and hung on the hangers 38 of the retainers at the opposite ends of the conduit to prevent the wires from being chafed as the door opens and closes and the contract flexes as an accordion to accommodate the door swinging movement. Should it be necessary to remove the conduit, the conduit is simply compressed like during installation in an area to act on the arms 29 and 33 to contract the loops 32 and 26 to permit the projecting end corrugation 42 along with the retainer to be removed from the hole.

The other embodiment of the retainer designated 21 shown in FIGS. 7 through 11 provides the same retention operation as previously described but with a simple split annular part which may be more readily manufactured from spring steel strip stock or injection molded in plastic. Again, no modifications are required of the conduit 11 and its proportions relative to the hole 19 remain the same. The retainer 21 comprises a split corrugated ring having a first inwardly extending corrugation 54 which conforms to and engages the interior of the adjacent outwardly extending corrugations 42 at the end of the conduit on the opposite interior sides of the intermediate inwardly extending conduit corrugation 41. The retainer corrugation 54 thus serves as two expandable rings which operate like the two loops 26 and 32 of the previously described retainer embodiment 20 to retain the conduit in the hole against push and pull movement and also hold the conduit in sealing contact with the surface of the hole.

For insertion and removal of the conduit with the retainer 21 in place in the conduit, the retainer is provided with an integral outwardly projecting corrugation 55 and a second inwardly projecting corrugation 56 which are located inward of the first corrugation relative to the end of the conduit. The second inwardly projecting corrugation 56 provides a channel to which a contracting force can be applied to and maintained on the retainer ring by a conventional ring clamping tool gripping the overlying inwardly projecting conduit corrugation to permit both insertion and removal of the conduit relative to the wall opening with the conduit retainer in place. In addition, the retainer 21 is provided at one end with annularly projecting side rails 58 which overlap with the outer sides 60 of the ring at its other end to maintain alignment of the two ends of the ring as the ring is contracted for such insertion and removal. The retainer ring is also provided with a wiring hanger 61 which is welded or bonded at one end 62 to the interior of the ring and at its other end is formed with a hook 63 to receive the wiring.

Thus, with both embodiments of the retainer, the corrugated conduit can be made in continuous lengths from which desired part lengths can be cut since it is not necessary that the conduit be preformed to the desired length with special end provisions for a particular application. Furthermore, both embodiments of the retainer may be preassembled into the ends of the conduit and thus permit blind assembly of the conduit where access is only available on the side of the wall from which the conduit is inserted in the wall opening. Alternatively, both embodiments of the retainer can also be inserted after the conduit is located in the wall opening where there is access behind the wall. In addition, the retainer of the present invention can be readily formed with an integral wiring support or hanger thus eliminating any need for a separate wiring support attached to the end of the conduit or to the part to which the conduit is being attached. Furthermore, the arrangement of the wire loops in the one embodiment of the retainer and the corrugations of the split ring in the other embodiment positively prevent axial pull-out or push-in of the conduit assembly by their substantial outward displacement from the hole on opposite sides of the wall. Furthermore, both embodiments of the retainer permit the greatest number of corrugations in the allowed conduit space and thereby allow maximum controlled accordion bending of the conduit to prevent inward collapse of the conduit where they are attached in the openings at either end. And it will also be understood that while the retainer of the present invention has been shown in use with a conduit having saw-tooth corrugations, the retainer is also adaptable to other corrugated shapes such as those with a sinusoidal and square wave forms in which event the spring wire embodiment would remain unchanged but the split annular part embodiment would be similarly formed for optimum results.

The above described preferred embodiments are illustrative of the invention which may be modified within the scope of the appended claims.

The embodiments of the invention in which an exclusive property or privilege is claimed are defined as follows:

1. A wall with a hole, a corrugated conduit insertable in the hole and having outwardly extending corrugations whose diameter is larger than that of the hole, a single retainer for retaining the corrugated conduit in the hole in the wall, said retainer being receivable within one end of the conduit and comprising a wire having a pair of expandable loops for engaging the interior of two outwardly extending corrugations of the conduit on the opposite interior sides of an intermediate inwardly extending corrugation to resiliently retain the two outwardly extending corrugations outward of the hole on opposite sides of the wall while holding the intermediate inwardly extending corrugation outward against the surface of the hole, said wire further having a pair of arms originating at the loop nearest the one end of the conduit operatively engageable with the other loop and the interior of the conduit so as to be responsive to compression of the conduit by an externally applied force to contract both said loops with said conduit to permit both insertion and removal of the conduit with the retainer in place in the conduit.

* * * * *